United States Patent [19]
Shuey

[11] 3,898,583
[45] Aug. 5, 1975

[54] LASER STABILIZATION TECHNIQUE

[75] Inventor: David R. Shuey, Webster, N.Y.

[73] Assignee: Xerox Corporation, Stamford, Conn.

[22] Filed: Dec. 28, 1973

[21] Appl. No.: 429,246

Related U.S. Application Data

[63] Continuation-in-part of Ser. No. 239,144, March 29, 1972, abandoned.

[52] U.S. Cl. ............ 331/94.5 S; 250/205; 331/109; 331/203; 307/297; 328/167; 330/4.3
[51] Int. Cl. .............................................. H01s 3/09
[58] Field of Search .................. 331/94.5, 109, 203; 250/205; 307/297; 328/167; 330/4.3

[56] References Cited

UNITED STATES PATENTS 3,778,791 12/1973 Lewicki et al. ............... 331/94.5 X

*Primary Examiner*—Robert J. Webster

[57] ABSTRACT

The output power level of a laser is stabilized at a predetermined set point by a feedback control circuit. The light emitted from one end of a laser is detected and converted into an electrical current by a photodetector. This current is then amplified and converted into a proportional voltage by a buffer amplifier and the resultant voltage is compared to a reference voltage to provide an error signal. The error signal is integrated and fed back to correctively adjust the driving current for the laser, thereby compensating for any tendency of the power level of the light beam emitted from the other end of the laser to drift from a predetermined set point.

7 Claims, 7 Drawing Figures

LASER STABILIZATION TECHNIQUE

CROSS-REFERENCE TO A RELATED APPLICATION

This is a continuation-in-part application based on and claiming the benefit of the Mar. 29, 1972, filing date of an earlier U.S. Pat. application, Ser. No. 239,144, now abandoned, by David R. Shuey, for "Laser Output Power".

FIELD OF INVENTION

This invention relates to lasers and, in particular, to improved feedback control circuits for stabilizing lasers.

BACKGROUND OF THE INVENTION

Recent advances in laser technology have prompted many in various technologies to take advantage of the coherence and monochromatic characteristic of the energy emitted thereby. Once such application is in a facsimile transmitter where the laser is used to scan a document so that the light reflected from the document can be used to produce video signals which are then transmitted, as described in a copending and commonly assigned U.S. application, Ser. No. 227,939, filed on Feb. 22, 1972, abandoned in favor of continuation-in-part application Ser. No. 361,387, filed May 17, 1973. A companion application involves modulation of the laser in a facsimile receiver in response to the incoming video signal to provide a modulated light beam to discharge a photoreceptor of a xerographic copier in an image-wise configuration to produce a facsimile copy, as described in a copending and commonly assigned U.S. Patent Application, Ser. No. 227,763, filed on Feb. 22, 1972.

In the attempt to apply the laser in the facsimile art, it was found that available lasers have a number of inherent deficiencies which rendered them less than satisfactory for that application. For instance, it was found that power level of the beam produced by such a laser tends to drift. While it was found that the laser tends to stabilize to a degree once it reaches operating temperature, this required a considerable amount of time during which the drift is especially pronounced. Moreover, even after the laser reaches its operating temperature there is some residual drift. This is a problem in many applications where a fast response is important. For example, facsimile systems relying on lasers for scanning or printing are adversely affected by any such drift.

SUMMARY OF THE INVENTION

Therefore an object of the present invention is to stabilize the output of a laser at a desired power level.

Another object of the present invention is to provide improved long term and short term stability in the power output of a laser.

Still another object of the present invention is to provide stability in the power output of a laser which is subject to being modulated ON and OFF according to an input signal.

The foregoind and other objects of the present invention are obtained by a feedback control arrangement for lasers. In providing the feedback control, the emission from one end—either front or rear—of the laser is sensed by a photodetector which converts the detected light into an electrical current which, in turn, is amplified and translated into a proportional voltage by a buffer amplifier. The resultant voltage is then compared to a reference voltage to produce an error signal, and the error signal is integrated and fed back to internally modulate the laser as necessary to stabilize the output from the other end of the laser at the set point power level.

Other objects and features of the present invention will become apparent when the following detailed description of the illustrative embodiments of the present invention is read in conjunction with the accompanying drawings.

DETAILED DESCRIPTION OF THE ILLUSTRATIVE EMBODIMENTS

Figure 1:
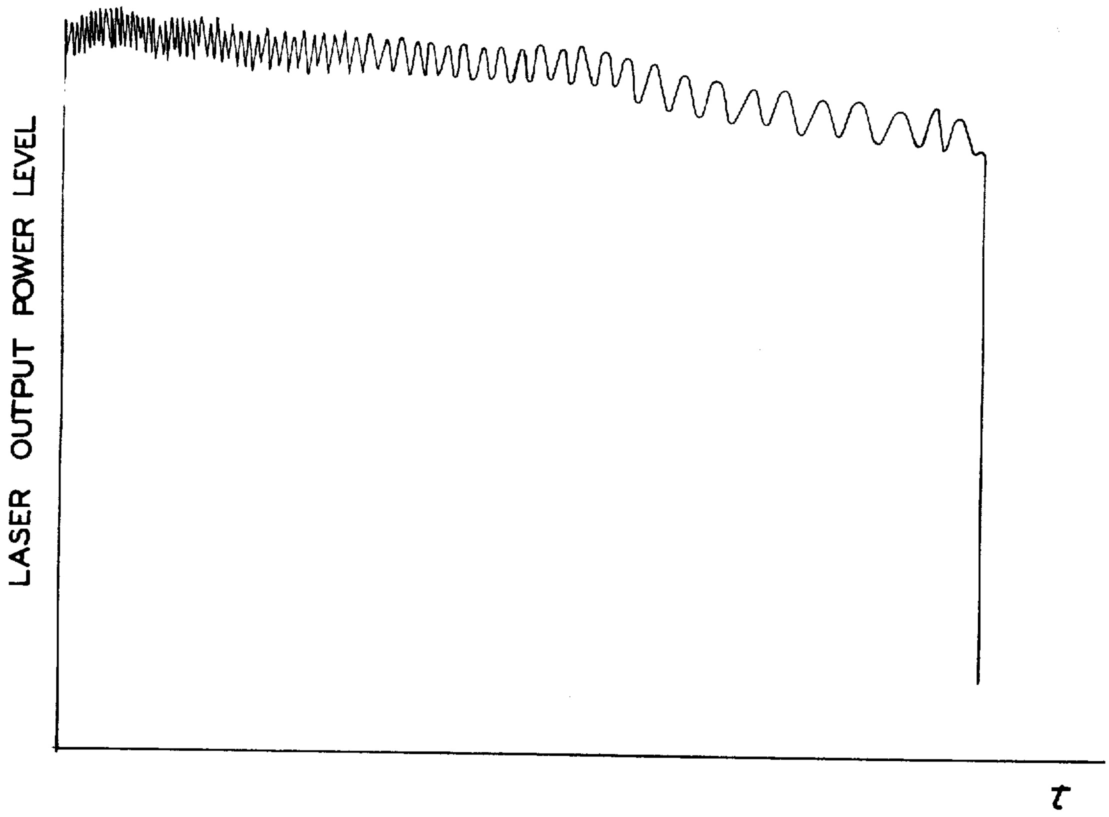
FIG. 1 is a graph of the power output of a typical prior art laser as a function of time and illustrates the characteristic instability of the laser as it is heating toward and after it has achieved its operating temperature.

As shown in FIG. 1, it was found that prior art lasers suffer from a tendency to drift. This drift involves two aspects. First, there are long term variations in the average energy level of the emitted laser beam which are believed to be principally caused by thermal instability of the laser inasmuch as such variations are particularly evident during the period immediately after the lasing action is initiated while the laser is heating toward its ultimate operating temperature. Secondly, there are also short term variations which are generally sinusoidial and often of substantial amplitude. The frequency of these short term variations tends to decrease as a function of time, but the sinuosidial fluctuations in the beam energy level are still the source of serious problems in various worthwhile applications for lasers. For instance, it has been found that both short term and long term stability of the emitted laser beam are highly desirable when the beam is to be used for facsimile scanning or printing.

Figure 2:
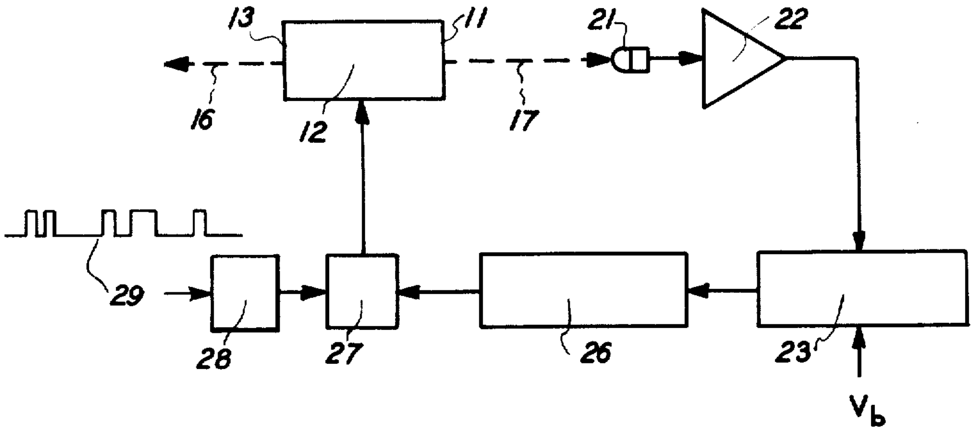
FIG. 2 shows a block diagram of the laser system including a feedback control circuit in accordance with this invention.

Referring to FIG. 2, in accordance with the present invention, the foregoing shortcoming is substantially eliminated by feedback circuitry that stabilizes the laser output. It was found that the intensity of the light emitted from one end, say, the rear end 11 of a laser tube 12, bears a proportionate relationship to the intensity of the beam emitted at the other or front end 13 of the laser. In accordance with the present invention the beam from the rear is used by a novel feedback control circuitry to stabilize the output at the front end as it is being modulated by the modulating or facsimile signal.

Figure 3:
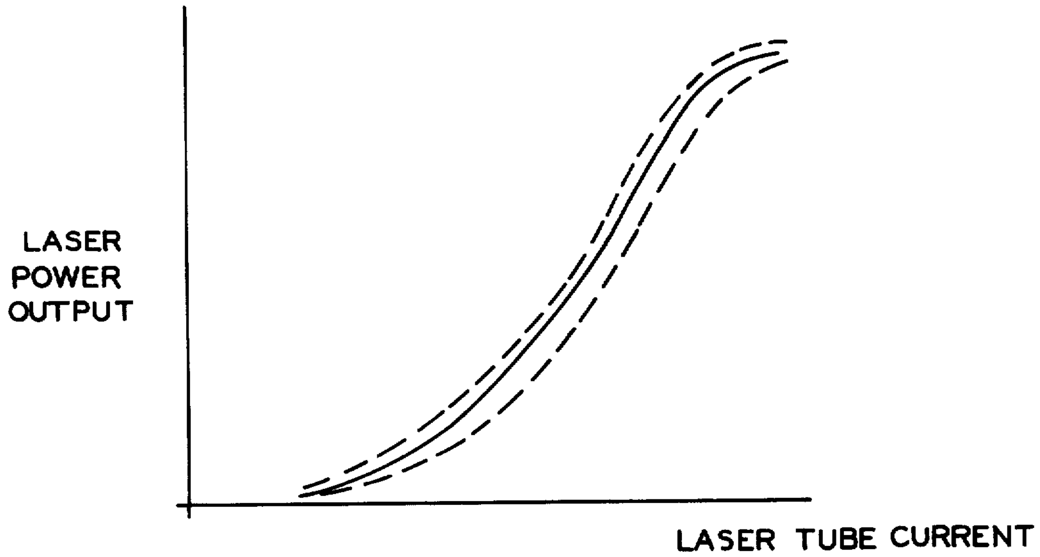
FIG. 3 is a graph showing laser power output as a function of laser tube current.

Referring to FIG. 2, it will be seen that coherent light beams 16 and 17 are emitted from the front 13 and the rear 11 of the laser 12 when the laser is energized. The relationship between the power levels of the front and rear light beams is fixed and is determined by the internal optical design characteristics of the tube, in general, and the relative transmissivity of the end mirrors (not shown), in particular. In accordance with the present invention, the rear emission is sensed by a photodetector 21 which converts the light beam 17 into an electrical current having an amplitude directly proportional to the power level of the beam 17. This current is then amplified and translated into a proportional voltage via a buffer amplifier 22. The resultant voltage is then compared by a comparator 23 with a reference voltage $V_b$ to generate an error signal. The error signal is integrated by an integrating circuit 26 and fed back to a power source 27 which pumps the laser 12. The present laser system may further include a modulator 28 which modulates the laser 12 in response to an input signal from an input signal source 29. Referring to FIG. 3, the solid line curve shows that the laser power output varies as a function of the laser tube current, within a certain range, as depicted by the pair of dotted curves. As evident from FIG. 3, if the output of the laser is to be kept at a constant level, the current has to be varied accordingly.

Figure 4:
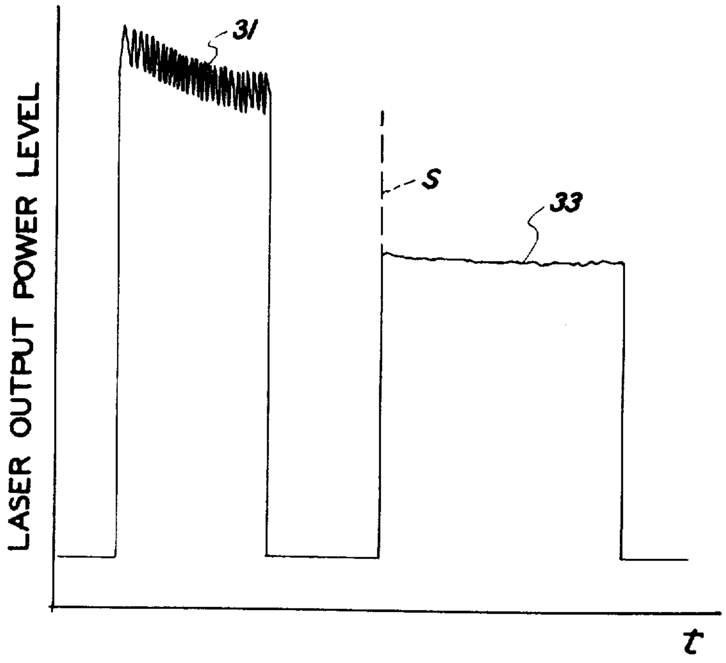
FIG. 4 is a graph which shows the drift in the output of the laser as a function of the tube current, with and without the feedback control circuit.

Referring to FIG. 4, the left-hand portion 31 of the curve indicates that substantial drift and noticeable A.C. ripple in the output power level of the laser 12 when it is operated without the benefit of the stabilizing circuit. The right-hand portion 33 of the curve shows the stabilization effect achieved by the present feedback circuit in that, as shown there, the long term power drift is eliminated and the amplitude of the AC, ripples is substantially reduced.

Figure 5:
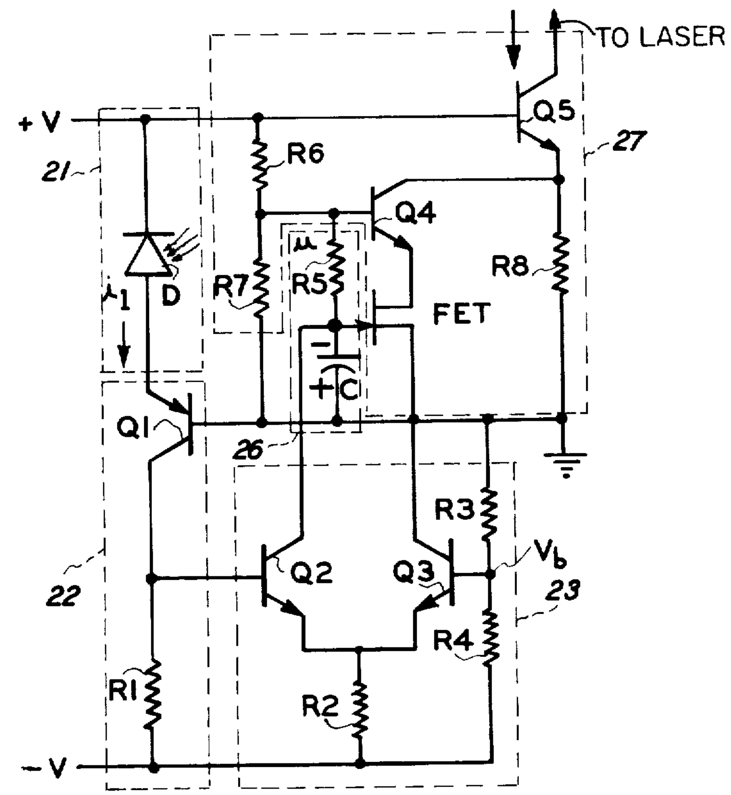
FIG. 5 shows an embodiment of the feedback control circuit in accordance with the present invention.

FIG. 5 shows an illustrative embodiment feedback circuit for stabilizing the laser in accordance with this invention. As shown, a phototransistor or a photodiode D, or any other suitable photodetector device, is used to convert the light energy of the laser into a proportional current. The photodetector usually is a high impedance element. Thus, a buffer amplifier 22 is used to act as a buffer between the photodiode D and a comparator 23. Specifically, the output of the photodiode D is connected to the input of the buffer amplifier, which includes a transistor Q1. The output of the transistor Q1 is applied to a resistor R1 to develop a voltage proportional to the amplitude of the current from the photodiode D. The comparator 23 comprises a differential amplifier, which is formed from the transistors Q2 and Q3 and the resistors R2, R3 and R4 connected in the manner shown.

The integrating circuit 26 includes a capacitor C connected to the differential amplifier to charge or discharge in response to the state of the output of the differential amplifier. The rate at which the capacitor C charges is determined by the voltage across R1 and the gain of the comparator amplifier 23. The power source 27 for pumping the laser includes a transistor Q4, a pair of biasing resistors R6 and R7, and a field effect transistor FET operatively connected as shown, whereby the conductivity of the FET and, therefore, of the transistor Q4 are controlled by the capacitor C. The power source includes an output stage having a transistor Q5 normally biased to conduct so that the laser is activated under quiescent conditions. As will be appreciated, the magnitude of the current applied to the laser under quiescent conditions is determined largely by the value of the resistor R8 and by current passing through the transistor Q4.

The feedback control circuit shown in FIG. 5 operates as follows: The photodetector diode D conducts in response to the light emitted from the rear of the laser 12, thereby providing a current having a magnitude proportional to the power level of the light beam. In response to that current, the buffer amplifier produces a proportional voltage across the resistor R1, and this voltage is then applied to the base electrode of the transistor Q2 of the differential amplifier-type comparator 23. The buffer amplifier 22 presents a low input impedance to the photodetector diode D while maintaining the voltage across the diode constant. This nullifies the capacitive effect of the photodetector diode and increases its speed of response. The voltage applied to the base electrode of the transistor Q2 is compared to the reference voltage at the other side of the differential amplifier, that is, at the base electrode of the transistor Q3. When the voltage applied to the base electrode of the transistor Q2 exceeds the reference voltage, the transistor Q2 conducts, thereby charging the capacitor C of the integrating circuit 26 to a more negative voltage level. This voltage appears at the gate electrode of the FET. As the voltage goes more negative, the impedance of the FET increases, thereby causing the current through the transistor Q4 to decrease. The current from the collector electrode of Q4 is added to the current flowing through the resistor R8, and the sum of these currents is applied to the emitter of transistor Q5. The current flowing through a transistor W5 is applied to the cathode (not shown) of the laser to pump the active element of the laser 12 to emit light, as more fully described in the copending and commonly assigned U.S. application, Ser. No.: 204,847, filed on Dec. 6, 1971, now U.S. Pat. No. 3,761,799.

In operation, when the power level of the light beam emitted from the rear of the laser 12 increases, it causes the photodiode D to pass more current $i_1$. Under those conditions, there is a proportional increase in the voltage across R1. This increases the conductivity of the transistor Q2, thereby causing the capacitor C to charge more negatively. That, decreases the conductivity of the transistor Q4, thereby reducing the currents drawn through the transistor Q5 to, in turn, reduce the current applied to the laser so that the power level of the laser beam is reduced or, in other words, returned toward its set point.

Contrariwise, when the beam output power level drops, the current drawn through the photodiode D decreases. This reduces the voltage applied to the base of the transistor Q2 and thereby decreases its collector current. The capacitor C, therefore, discharges through the resistor R5. That causes the gate electrode of the FET to become less negative, thereby increasing its conducitivity such that the current drawn through the transistor Q4 is increased to return the power level of the beam from the laser 12 toward its set point.

Figure 6:
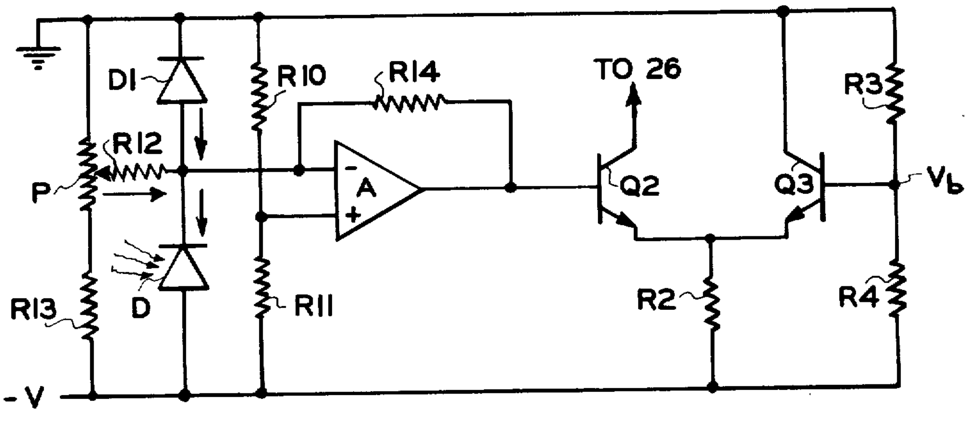
FIG. 6 shows a modified portion of the illustrative embodiment of the feedback circuit of the present invention, shown in FIG. 5.

As shown in FIG. 6, in a modified embodiment of this invention buffer amplifier 22 utilizes an operational amplifier A in place of the transistor Q1 shown in FIG. 5. Also, a pair of resistors R10 and R11 are provided, and the values of those resistors are selected to be proportional to the values of the resistors R3 and R4. Thus, the voltage applied to the non-inverting terminal of the operational amplifier A is maintained at the same level as the reference voltage $V_b$, which is applied to the base of the transistor Q3. The inverting terminal of the operational amplifier A is connected to a potentiometer P through a coupling resistor R12, and the bias current level at its inverting input is adjusted by the potentiometer P and a resistor R13 as shown. The photodetector D is interposed between the inverting input of the operational amplifier A and the DC power supply. The operational amplifier A has a feedback resistor R14 connected between its output and its inverting input which, in turn, is returned to ground through a reversely poled diode D1. The diode D1 neutralizes the inherent, but undesirable, dark current of the photodiode D, even through that current may be appreciable, especially at higher temperatures since it roughly doubles for every 10° centigrade or so increase in temperature. Specifically, the diode D1 is selected to have a temperature versus leakage current characteristic that is substantially identical to the temperature versus dark current characteristic of the photodiode D. That means that the dark current of the photodiode D may be ignored, provided that the bias current applied to the inverting input of the operational amplifier A is adjusted by the potentiometer P and resistor R12 to directly offset the leakage current of diode D1 under quiescent conditions with the laser activated. Thereafter, whenever the intensity of the light applied to the photodetector D increases, the increased current therethrough causes the output terminal of the operational amplifier A to become increasingly positive, thereby causing the transistor Q2 to become increasingly conductive. When that occurs, the capacitor C charges negatively, thereby reducing the current drawn by the transistor Q4 to, in turn, decrease the current supplied to the laser through the transistor Q5. Of course, the converse operation takes place when the power level of the laser beam drops below its set point.

Figure 7:
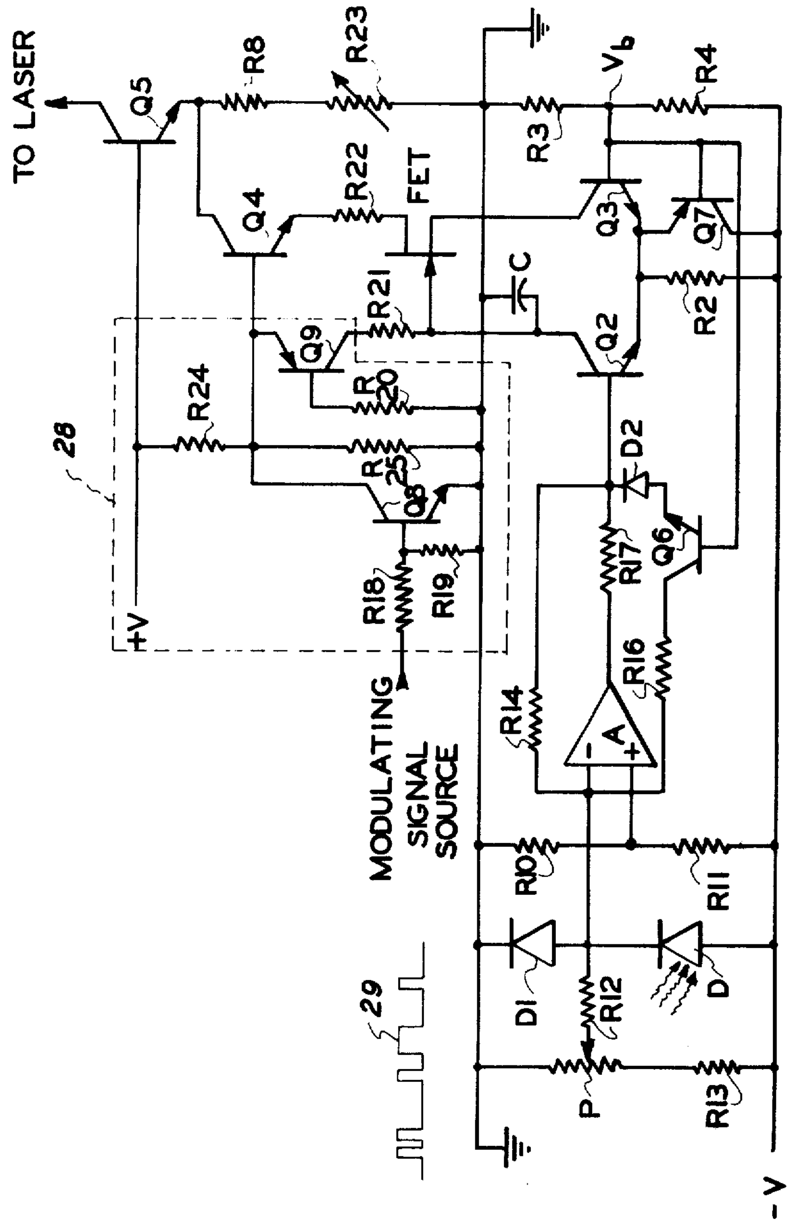
FIG. 7 shows still another modification of the illustrative embodiment of the feedback control circuit of the present invention, shown in FIG. 6, which includes means for modulating the output of the laser.

FIG. 7 shows a further modification of the feedback control circuit of the present invention. Specifically, there are means 28 for providing a modulating signal 29 for the laser. As shown, the operational amplifier A includes an additional feedback loop comprising a resistor R16, a transistor Q6, and a diode D2 connected in parallel with the feedback resistor R14, and the output of the operational amplifier A is coupled to the feedback circuits by a series resistor R17. Additionally, the base electrode of the transistor Q6 is connected to the base electrode of the transistor Q3 of the differential amplifier as shown.

As will be recalled, the output voltage of the operational amplifier A becomes increasingly negative as the current applied to its inverting terminal is reduced. In fact, the operational amplifier A tends to go into negative saturation when the laser is modulated off. When that occurs, the response time of the operational amplifier A is increased. The additional feedback loop eliminates the foregoing problem by preventing the operational amplifier A from becoming saturated. That is, the output of the operational amplifier A goes negative relative to the base of the transistor Q3, the transistor Q6 and the diode D2 conduct, thereby effectively inserting resistor R16 in parallel with the feedback resistor R14. Consequently, the resistors R14 and R16 then form a parallel network so that the closed loop gain of the operational amplifier A is reduced, thereby preventing it from reaching negative saturation.

As shown in FIG. 7, an additional transistor Q7 is provided to eliminate spikes (see FIG. 4) that would otherwise appear in the leading edge of the feedback current appearing at the collector electrode of Q4 when the photodetector D is initially subjected to incident light.

The circuit shown in FIG. 7 operates as follows: When turned on, the laser output is at its maximum level since the capacitor C causes saturated conduction of the FET. Thus, the photodiode D conducts heavily and the output of the amplifier A goes to a high positive voltage level. This pulls the emitter of the transistor Q2 toward a high positive voltage, thereby turning the transistor Q7 "on" hard. Q7 virtually clamps the emitter of the transistor Q2 to the base voltage of the transistor Q3 and provides a very low impedance. This causes the transistor Q2 to conduct very heavily, thereby charging capacitor C at a very fast rate. As the laser power is decreased, the system approaches its quiescent state and the base voltage of the transistor Q2 approaches the base voltage of the transistor Q3, causing the transistor Q7 to become non-conductive.

Alternatively, of course, a diode (not shown), poled to block the spike may be coupled between the collector electrode of the transistor Q2 to prevent the spike-like current form being applied to the capacitor C and the FET.

As shown in FIG. 7, the light beam 16 from the laser is turned on and off in response to a train of signal pulses 29 applied to a modulating means 28. The modulating means 28 includes a transistor Q8 together with resistors R18 and R19, to provide a switch for turning the laser on and off in response to the modulating pulses 29. The modulating signal 29, which may be train of facsimile signals in the form of train of binary pulses, is applied through the resistor R18 to the base electrode of the transistor Q8. Thus, the transistor Q8 switches into conduction in response to positive going transition of the modulating signal and out of conduction in response to negative going transistions. Additionally, the modulator includes another transistor Q9 which has its emitter connected to the collector of the transistor Q8 and its base returned to ground through a resistor R20. A resistor R21 is interposed between the emitter of the transistor Q4 and the drain electrode of the FET, and the base of the transistor Q4 is connected to the collector of the transistor Q8. As arranged, the transistors Q9 and Q4 operate in unison, that they switch into and out of conduction simultaneously, depending upon the state of the transistor Q8. The emitter of the transistor Q9 and the base of the transistor Q4 are biased at suitable operating voltages by a pair of resistors R24 and R25 as shown.

As connected, when the feedback current is modulated off, that is, when the modulating signal turns Q8 on, Q9 and Q4 are turned off. Under those conditions, the potential applied to the gate electrode of the FET is at a fixed level as determined by the charge on the capacitor C. Since the transistor Q9 is non-conductive, there is no appreciable discharge of the capacitor C. Accordingly, the current for the laser is then determined substantially exclusively by the current drawn through the transistor Q5. Thus, the quiescent operating current for the laser may be then adjusted. For example, it may be set at just below the threshold for emission of light by the laser 12. In facsimile systems, the laser may be modulated on and off for printing of image and background areas, respectively.

When the transistor Q8 is turned off, the transistor Q9 and Q4 are turned on so that a current is added to the current drawn through the transistor Q5, that increases the operating current for the laser to a point above the threshold level such that a light beam is emitted.

The laser is then stabilized by the feedback circuitry. Specifically, the photodetector D supplies a current proportional to the power level of the light beam emitted from the rear of the laser 12 and this current is applied to the inverting terminal of the operational amplifier A. The operational amplifier converts that into a proportional voltage which the differential amplifier Q2, Q3 then compares against the reference potential. The capacitor C provides the controlling voltage to adjust the feedback current added to the operating current to the laser via the FET and the transistors Q4 and Q5. The level of current at which the laser light is turned off is manually adjusted by setting the variable resistor R23.

Now considering the overall operation of the circuit shown in FIG. 7, assume that a high logic level (e.g., +5 volt) input signal is applied to the base of the transistor Q8. That causes the transistor Q8 to saturate or turn on and cause the transistors Q9 and Q4 to turn off. Under those conditions, the current for the laser is adjusted by the resistor R23 so that the laser is held below its threshold point. Contrariwise, when the input signal applied to the base of the transistor Q8 drops to low voltage (for example, 0 volts) the transistor Q8 switches out of conduction. That causes the transistors Q9 and Q4 to switch into conduction so that a feedback current is added to the operating current drawn through the transistor Q5 thereby activating the laser. The photodetector D provides a current proportional to the detected level or energy of the light beam emitted by the laser, and the operational amplifier A converts that current into a proportional voltage. That voltage is then compared against the reference voltage by the differential amplifier, thereby causing the capacitor C to charge and discharge as necessary to stabilize the power level of the laser output at its set point, as previously described. Finally, transistor Q7 bleeds out the surge current as explained above when the laser is initially turned on, or more generally, when the current applied to the feedback circuit by the photodetector is large enough so that the current induced in Q2 forward biases Q7 and causes it to conduct.

CONCLUSION

Accordingly, it will now be appreciated that this invention provides increased long and short term stability for lasers by an internal modulation technique.

What is claim is:

1. In combination with a laser for providing a beam of monochromatic coherent radiation in response to a discharge current, a control circuit for stabilizing said beam at a predetermined set point energy level, said control circuit comprising in combination detector means coupled to said laser for providing a first signal having a voltage which tends to track any variations in the energy level of said beam, said detector means including a photodetecting diode positioned to intercept said coherent light beam for providing a current proportional to the energy level of said beam, and a buffer amplifier responsive to the current from said photodetecting diode for providing said first signal, said buffer amplifier including an operational amplifier having an inverting input, a non-inverting input and an output, comparator means including a differential amplifier having one input coupled to receive said first signal and another input held at a reference voltage corresponding to said set point energy level of said beam for comparing said first signal against said reference voltage level to provide an error signal having a voltage proportional to any difference between the energy level of said beam and said set point level, integrating means including a capacitor coupled to said comparator means to provide a feedback signal having a level proportional to a time-average value of said error signal, means coupled between said integrating means and said laser for applying said feedback signal to said laser for adjusting said discharge current to thereby stabilize said beam at said set point level, means for biasing the non-inverting input of said operational amplifier at said reference voltage level, a first feedback loop including a resistor connected from the output to the inverting input of said operational amplifier, means for biasing the inverting input of said operational amplifier at a predetermined level, and a diode connected to said inverting input for neutralizing the dark current through said photodetecting diode so that the dark current is prevented from affecting the feedback signal.

2. The control circuit of claim 1 further including a second feedback loop for said amplifier; said second loop including a second transistor having a collector-emitter circuit connected between the output and the inverting input of said amplifier in parallel with said first feedback loop and a base electrode biased to cause said second transistor to switch into conduction when the output of said amplifier reaches a predetermined pre-saturation level, whereby saturation of said amplifier is avoided.

3. The control circuit according to claim 2 wherein said differential amplifier includes bypass means connected to said one input for bleeding off any transient currents accompanying said first signal.

4. The control circuit according to claim 3 wherein said bypass means includes a transistor.

5. The control circuit according to claim 3 wherein said bypass means includes a diode connected to the output of said differential amplifier, said diode being poled to block any such transient currents.

6. In combination with a laser for providing a beam of monochromatic coherent radiation in response to a discharge current, a control circuit for stabilizing said beam at a predetermined set point energy level, said control circuit comprising in combination detector means coupled to said laser for providing a first signal having a voltage which tends to track any variations in the energy level of said beam, said detector means including photodetecting means positioned to intercept said coherent light beam for providing a current proportional to the energy level of said beam, and a buffer amplifier responsive to the current from said photodetecting means for providing said first signal, comparator means including a differential amplifier having one input coupled to receive said first signal and another input held at a reference voltage corresponding to said set point energy level of said beam for comparing said first signal against said reference voltage level to provide an error signal having a voltage proportional to any difference between the energy level of said beam and said set point level, integrating means including a capacitor coupled to said comparator means to provide a feedback signal having a level proportional to a time-averaged value of said error signal, and means coupled between said integrating means and said laser for applying said laser for adjusting said discharge current to thereby stabilize said beam at said set point level, said means for applying said feedback signal to said laser including means for setting the discharge current of said laser at a nominal level below a predetermined threshold level at which said laser is activated to emit said light beam, and means for algebraically combining the time averaged error signal with the nominal discharge current for said laser to thereby stabilize the energy level of said beam, said combining means including a first transistor having a collector-emitter circuit connected to provide a nominal load impedance for series current flow of said discharge current, and a second transistor having a collector-emitter circuit connected in parallel with at least a portion of the collector-emitter circuit of said first transistor, said second transistor being coupled to said integrating means to respond to said time-averaged error signal for varying the impedance to said current flow as a function of said time-averaged error signal.

7. The control circuit of claim 6 further including modulating means coupled to said second transistor for switching said second transistor between a conductive and a non-conductive state to thereby modulate the energy level of said beam.

* * * * *